H. LEMP.
HEATING SYSTEM.
APPLICATION FILED JULY 2, 1908.
919,366.
Patented Apr. 27, 1909.
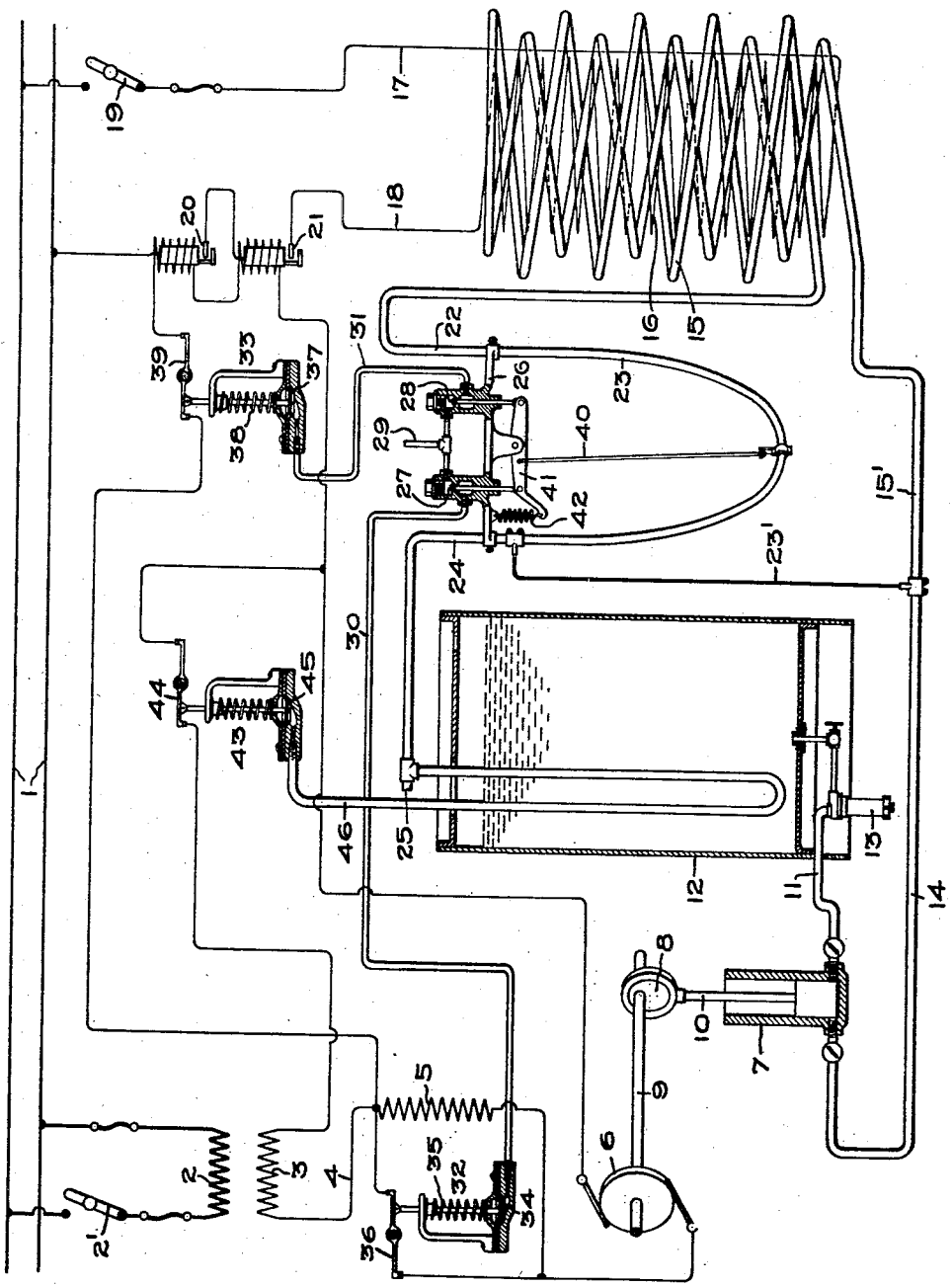
Witnesses:
J. Ellis Glen
J. Earl Ryan
Inventor,
Hermann Lemp,
By
Att'y.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

HEATING SYSTEM.

No. 919,366.  Specification of Letters Patent.  Patented April 27, 1909.

Application filed July 2, 1908. Serial No. 441,689.

*To all whom it may concern:*

Be it known that I, HERMANN LEMP, a citizen of the United States, residing at Lynn, county of Essex, State of Massachusetts, have invented certain new and useful Improvements in Heating Systems, of which the following is a specification.

The present invention relates to heating apparatus and is adapted more especially for service on electric locomotives to supply heating fluid to the coils or radiators which warm the railway cars or coaches drawn by the locomotive.

The object of the invention is the provision of a heating system including heat producing apparatus of improved construction wherein the heat is derived from an alternating current electric circuit, which system after the apparatus is once started will continue to automatically supply heated fluid in the form of steam or hot water at such a pressure and temperature as are best suited to the requirements of the service.

For a consideration of what I consider to be novel and of my invention, attention is called to the specification and claims which follow.

The accompanying drawing shows in a diagrammatic manner my improved heating system as adapted for use in connection with a source of alternating current such as the supply for an alternating current electric locomotive.

The line conductors 1 can be any conductors suitable for receiving and carrying current from the supply by which the locomotive is operated, such as a supply of alternating current at relatively high voltage. If this voltage is higher than that preferred for use with certain apparatus forming part of the system, the primary coil 2 of a suitable transformer may be connected to the line, current of desired voltage being supplied to the apparatus from the secondary coil 3 of the transformer. The circuit of the coil 2 is controlled by a switch 2'. A conductor 4 carries current from the coil 3 through a starting resistance 5 to a motor 6 which drives a pump 7 by means of suitable gearing or other connections such as an eccentric 8 on the motor shaft 9, said eccentric having a rod 10 that operates the pump plunger or piston. A pipe 11 conveys water from the tank 12 to the suction side of the pump. The pipe 11 is provided with a strainer 13.

A pipe 14 conveys water from the pump to a heating coil 15 which is inclosed in a suitable casing (not shown) to form a boiler or heater in which steam is generated or water heated for warming the cars drawn by the locomotive on which the boiler is located. The coil 15 can be made of copper, brass, iron or other suitable electrically conductive material, preferably of relatively low resistance, said coil forming the secondary of a transformer and heating the water or steam within it by the heat generated by the resistance of the walls of the tubing to the current flowing in them. The resistance of the column of water in the coil is so great that there is no danger of an appreciable current of electricity flowing through it to other parts of the system. The coil is suitably insulated from the boiler casing and its turns are insulated from each other. The primary coil 16 of the transformer is located in operative relation to the secondary coil 15 and is connected to the line conductors 1 by conductors 17 and 18, the circuit of the coil being provided with a switch 19 and a circuit breaker comprising contactors 20, 21 which are controlled by the current flowing in a circuit which includes the coil 3 of the other transformer. The contactors 20, 21 are arranged in series so that if one is burned and fails to open, the other will open. They are operated by relay magnets in any well-known manner.

From the outlet end 22 of the coil 15 the hot water or steam passes into and through a thermostat tube 23 to a pipe 24, the end 25 of which is connected to other piping leading to coils or radiators in the cars to be warmed. A conductor 23' connects the outer end of the thermostat with the inlet end 15' of the coil 15 and in effect short-circuits the secondary coil 15 of the transformer through the thermostat. At the upper end of the thermostat, as illustrated, is an insulated fixed frame or casing 26 containing two valves 27, 28 which control the flow of compressed air from the train-pipe 29 through conduits 30 and 31, respectively, to the regulators 32 and 33 located in circuits which include the transformer coil 3. Thus the regulators 32 and 33 are under the control of the thermostat although not moved directly by it.

The regulator 32 comprises a casing containing a diaphragm 34 whose upward movement is opposed by an extension spring 35. The movements of the diaphragm automatically control a switch 36 which is normally closed to short-circuit the starting resistance 5 in the motor 6 but is opened by the spring 35 whenever the air pressure on the diaphragm falls below a certain amount. The regulator 33 comprises a casing containing a diaphragm 37 that is opposed by a compression spring 38. The diaphragm 37 controls a switch 39 in the contactor circuit. So long as the pressure on the diaphragm is less than a certain amount the spring 38 holds the switch closed, but when it rises above a certain amount the diaphragm is moved to open the switch, thereby interrupting the circuit of the contactors 20, 21, and opening the circuit of the primary coil 16. As soon as the primary current ceases the secondary current also ceases and no heat energy is delivered to the heater.

The valves 27, 28 which regulate the application of air pressure to the diaphragms 34, 37, are operated by the thermostat 23 by means of the rod 40 and the lever 41. If the temperature increases abnormally the thermostat tube 23 will expand sufficiently to draw the rod 40 downwardly to such an extent as to move the lever 41 in a manner to open the valve 28 to apply pressure on diaphragm 37 to open the switch 39 and interrupt the circuit of the primary coil 16 as previously described. The same movement of the lever 41 closes the valve 27, thus relieving the pressure on the diaphragm 34, thereby permitting the spring 35 to open the switch 36 and put the resistance 5 into circuit with the motor to slow down said motor and pump. The spring 42 actuates the lever 41 to close valve 28 and open valve 27 when the temperature returns to its normal value.

To control the pressure of the supply of the heating medium to the train a regulator 43 and switch 44 similar to the regulator 33 and switch 39 are placed in the circuit leading from the motor 6 and contactors 20, 21 to the coil 3, the diaphragm 45 of the regulator being subjected to the pressure of said medium by the pipe 46 leading from the pipe 24 to the regulator. The pipe 46 is looped down through the water in the tank 12 to cool the steam or other heating medium and prevent it from injuriously affecting the diaphragm 45. When the pressure in the pipe becomes sufficiently great to overcome the spring of the regulator, the switch 44 is opened and the circuit from the motor 6 and contactors 20, 21, to the coil 3, is interrupted, thus stopping both the supply of water and of heat energy to the boiler until the pressure again becomes normal.

In a system of this character it is important to maintain the temperature and pressure of the heating fluid constant or substantially so. I accomplish this result by means of the thermostat 23, the pressure actuated regulator 43 and the parts controlled thereby, as above described. It is possible to have a high pressure in the boiler without the necessary quantity of heat. For example, the pump might be started into operation without closing the circuit of the heating transformer. On the other hand, the circuit of the heating transformer might be closed while the pump is idle. Without the thermostat controlling device, under this last condition the coil 15 might be overheated and damaged. One of the principal functions of the thermostat is the prevention of similar over-heating and damage should the water tank become empty through leakage or carelessness of the attendant, or the water piping become clogged by foreign matter; thus causing a failure of the water supply while the heating current is flowing.

One of the important features of the invention resides in the manner in which the parts are connected in circuit. It will be observed that the thermostat is located outside the heater or boiler proper and electrically connects the inlet and outlet of said boiler, thus short-circuiting the secondary coil 15 in which the heat is generated. The tubing of the boiler can be made of copper, brass, iron or other electrically conductive metal of relatively low resistance, and the tube of the thermostat of German silver, the latter alloy having a relatively high coefficient of expansion. Practice has demonstrated these materials to be satisfactory but the invention is not to be construed as limited thereto. As shown, the current after leaving the boiler passes through the walls of the thermostat tube before returning to the coil 15. This is important because if the current of electricity did not flow through the thermostat in this manner then said thermostat while still responsive to changes in temperature of the steam or other heating medium and acting as a regulator so long as the water supply was maintained and there was steam in the thermostat would become practically inoperative as soon as the water supply ceased. To state the matter in a different way, the normal flow of current through the thermostat heats it and tends to shut off the current, while the steam being of lower temperature tends to cool the thermostat sufficiently to prevent such action. From the foregoing it will be noted that it is the current of electricity flowing through the heater and not the steam as might be naturally supposed, that causes the system to shut down. In other words, the current of electricity heats the thermostat while the steam or other vapor generated in the heater cools it.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In a heating system, the combination of a source of electrical energy, a heater comprising a coil through the walls of which said source causes a current of electricity to flow to heat a liquid contained therein, a device for forcing liquid into the coil, and means for controlling both the flow of electricity through the walls of the coil and the admission of liquid to the interior of the coil.

2. In a heating system, the combination of a source of electrical energy, a heater, conductors between the source and the heater, a circuit breaker for controlling the supply of electricity to the heater, means for supplying liquid to the heater, and regulating means responsive to a condition of the liquid being heated which controls both the operation of the circuit breaker and of the means supplying liquid to the heater.

3. In a heating system, the combination of a source of electrical energy, a heater, conductors between the source and the heater, a pump for supplying the heater with liquid, a circuit-breaker for regulating the supply of electrical energy to the heater, a regulator for the pump, and a regulator for controlling the circuit breaker, both of said regulators being sensitive to one and the same condition of the fluid flowing through the heater.

4. In a heating system, the combination of a source of electrical energy, a heater, conductors between the source and the heater, a pump for supplying the heater with liquid, means for controlling the operation of the pump and of the heater circuit which is responsive to changes in the pressure of the fluid being heated, and means for controlling the operation of the pump and of the heater circuit which is responsive to changes in the temperature of the fluid being heated.

5. In a heating system, the combination of a source of electrical energy, a heater, conductors between the source and the heater, a pump supplying liquid to the heater, an electric motor for driving the pump, pressure actuated governing means for the motor and the heater circuit, and a device responsive to a condition of the liquid being heated for admitting fluid under pressure from a suitable source to said governing means.

6. In a heating system, the combination of a source of electrical energy, a heater, conductors between the source and the heater, a pump supplying liquid to the heater, an electric motor for driving the pump, a pressure actuated regulator controlling the operation of the motor and the heating circuit, and a conduit which conveys vapor pressure generated by the heater to said regulator to actuate it.

7. In a heating system, the combination of a source of electrical energy, a heater, conductors between the source and the heater, a circuit breaker in the heater circuit, a supply tank, a pump for supplying liquid from the tank to the heater, an electric motor for driving the pump, a pressure actuated regulator for controlling the motor and the circuit breaker, and a conduit which conveys vapor under pressure from the heater to the regulator to actuate the latter, said conduit passing through the liquid in the tank to cool the vapor.

8. In a heating system, the combination of a source of alternating current, a heater comprising a transformer connected to said source and having its secondary coil in contact with the fluid to be heated, conductors between the source and the primary coil of the transformer, a thermostat in circuit between the ends of the secondary coil, a device for supplying liquid to the heater, and means controlled by the thermostat for regulating the output of the heater.

9. In a heating system, the combination of a source of alternating current, a heater comprising a transformer connected to said source, its secondary coil being formed of tubing which receives the liquid to be heated, means for supplying the secondary coil with liquid, a thermostat which short-circuits the inlet and outlet of said coil, and means controlled by the thermostat for regulating the operation of the heater.

10. In a heating system, the combination of a source of alternating current, a heater, a primary transformer coil in the heater which is connected to said source, a coil of tubing in the heater which forms a secondary transformer coil in operative relation to said primary coil, the current flowing through the walls of said tubing, a thermostat in circuit between the ends of the secondary coil, a device for supplying liquid to the interior of said secondary coil, and means controlled by the thermostat for regulating the heating current.

11. In a heating system, the combination of a source of alternating current, a heater comprising a transformer having primary and secondary coils, the secondary coil being formed of tubing through the walls of which the heating current flows, connections between the source and the primary coil, a pump for supplying liquid to the interior of the secondary coil, a motor for operating the pump, a thermostat in circuit between the ends of the secondary coil, and means controlled by the thermostat for controlling the operation of the motor.

12. In a heating system, the combination of a source of alternating current, a heater comprising a transformer connected to said source and having primary and secondary coils, the secondary coil being formed of tubing through the walls of which the current flows to heat liquid therein, means for supplying liquid to the inlet end of the secondary coil, a conduit which leads to the apparatus to be heated, a tubular thermostat connected to the outlet of the secondary coil through the interior of which the heated fluid flows to said conduit and through the walls of which and the secondary coil the current flows in series, a conductor joining the outer end of the thermostat with the inlet end of the secondary coil, and means controlled by the thermostat for regulating the heating current and the supply of liquid to the heater.

13. In a heating system, the combination of a source of alternating current, a heater comprising a transformer having primary and secondary coils, connections between the primary coil and the source, a circuit breaker for controlling said connections, a pump supplying the heater with water, a motor for driving the pump, a second transformer connected to the source, an electric circuit including the secondary coil of said second transformer, a circuit breaker and switches which control the operation of the motor and the circuit breaker, and means sensitive to a condition of the water being heated which regulates the action of the switches and thereby controls the supply of water and heating current to the heater.

In witness whereof, I have hereunto set my hand this twenty ninth day of June, 1908.

HERMANN LEMP.

Witnesses:
 JOHN A. McMANUS, Jr.,
 HENRY O. WESTENDARP.